United States Patent [19]
Kawada et al.
[11] 3,758,789
[45] Sept. 11, 1973

[54] CARTRIDGE TYPE MAGNETIC TAPE RECORDING AND REPRODUCING APPARATUS

[75] Inventors: Toshio Kawada, Neyagawa; Tadashi Torama, Osaka; Tamio Kobayahsi, Hirakata, all of Japan

[73] Assignee: Matsushita Electric Industrial Co., Ltd., Osaka, Japan

[22] Filed: Oct. 3, 1972

[21] Appl. No.: 294,508

[52] U.S. Cl. .......... 307/116, 179/100.2 S
[51] Int. Cl. .......... G11b 31/00
[58] Field of Search .......... 307/149, 116, 119, 307/125, 130; 179/100.2 S, 100.2 Z; 222/30; 226/24, 33, 42, 43; 340/174 R

[56] References Cited

UNITED STATES PATENTS 3,583,617 6/1971 Kosaka .......... 179/100.2 S

*Primary Examiner*—Herman J. Hohauser
*Attorney*—Richard K. Stevens et al.

[57] ABSTRACT

A cartridge type magnetic tape recording and reproducing apparatus having a tape fast forward mechanism and being operable with an endless tape accommodated in a cartridge, which is so designed that a tape cartridge mounted in the apparatus is automatically ejected when a sensing switch is shorted by an electrically conductive foil carried on the tape during a tape fast forwarding operation.

2 Claims, 1 Drawing Figure

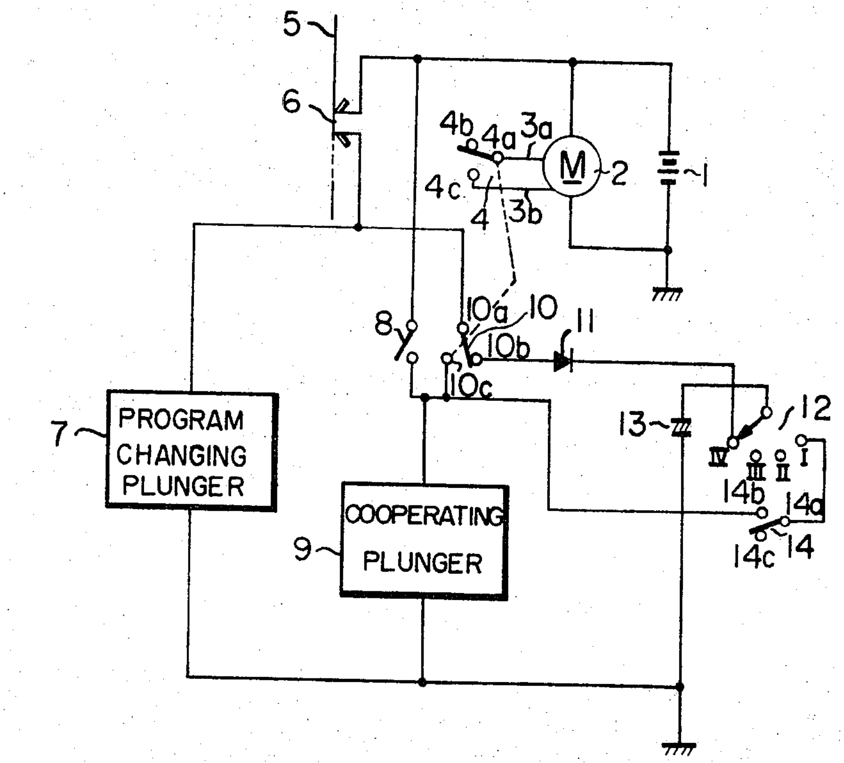
5
6
4b
4a
3a
M
2
1
4c
4
3b
8
10a
10
11
10b
10c
12
13
IV
III
II
I
14b
14a
14c
14
7
PROGRAM CHANGING PLUNGER
9
COOPERATING PLUNGER

CARTRIDGE TYPE MAGNETIC TAPE RECORDING AND REPRODUCING APPARATUS

This invention relates to an endless tape cartridge type magnetic tape recording and reproducing apparatus and contemplates the provision of a novel mechanism concerning fast forwarding of a tape.

A magnetic tape recording and reproducing apparatus operable with an endless tape cartridge is required to be so designated as to be capable of "retrieving" the starting (or ending) point of a recording program, especially in the case of recording.

To this end, an electrically conductive foil is attached to the tape accommodated in the cartridge, indicating the starting (or ending) point of the program, and a new program starts from a point immediately behind said conductive foil. Starting recording or reproduction from the retrieved starting point is advantageous, particularly in case of recording, in that recording can be achieved effectively and over the entire program. It is desirable also from the standpoint of operational efficiency of this type of apparatus, to stop the tape at the point when the starting point of the program has been retrieved to set the apparatus completely in a position ready for recording and thereafter drive the tape to perform recording.

The object of the present invention is to provide a novel mechanism concerning fast forwarding of a tape, which is so designed that the tape retrieval operation described above may be accomplished by the tape fast forward operation and further the tape cartridge may always be ejected upon completion of the tape retrieval operation, whereby the tape stops running.

A preferred embodiment of the invention will be described hereunder with reference to the accompanying drawing which is a circuit diagram showing an embodiment of the present invention.

In the drawing, reference numeral 1 designates a power source. A tape driving motor 2 is connected in parallel with the power source 1. The motor 2 has connected thereto lead wires 3a, 3b for fast forward, and a movable contact 4a and a stationary contact 4c of a fast forward switch 4 are connected to said lead wires 3a, 3b respectively but another stationary contact 4b thereof is normally out of connection with said lead wires. When the movable contact 4a of the fast forward switch 4 is in contact with the stationary contact 4b, the motor is rotated at a speed necessary to drive a tape at the normal speed for a recording or reproducing operation, whereas when the movable contact 4a is in contact with the stationary contact 4c, the lead wires 3a, 3b are electrically shorted with each other and the motor 2 is rotated at a speed higher than in case of driving the tape at the normal speed mentioned above, to perform fast forwarding of the tape. The power source 1 also has connected in parallel thereto a series circuit of a sensing switch 6 which will be electrically shorted by an electrically conductive foil provided on a tape 5, and a program changing plunger 7 which will move a head to change a program from recording to reproduction or vice versa. Further, the power source 1 has connected in parallel thereto a series circuit of a switch 8 and a cooperating plunger 9 for the manual ejection of a tape cartridge.

On the other hand, to the program changing plunger 7 is connected in parallel a series circuit of a movable contact 10a and a stationary 10b of a switch 10 operatively associated with the fast forward switch 4, a diode 11, a stationary contact IV and a movable contact O of a rotary switch 12 and a capacitor 13, said rotary switch 12 being of such a construction that its movable contact O is brought into contact with its stationary contacts I, II, III and IV successively repeatedly in association with the movement of the head, caused by the program changing plunger 7, for scanning the tape from the first to fourth program. Further, between the stationary contact I of the rotary switch 12 and a stationary contact 10c of the switch 10 are connected a movable contact 14a and a stationary contact 14b of an ejection selection switch 14 which is provided for selectively ejecting cartridges when the sensing switch 6 is electrically shorted by the electrically conductive foil upon termination of the fourth program, and the stationary contact 10c of said switch 10 is connected to the junction of the manual ejection switch 8 and plunger 9. A stationary contact 14c of the ejection selection switch 14 is normally held out of contact with the circuit.

Now, the operation of the apparatus constructed as described above will be described. In the normal state, the movable contact 4a of the fast forward switch 4 is held in contact with the stationary contact 4b, and the movable contact 10a of the switch 10 is held in contact with the stationary contact 10b. Further, the manual ejection switch 8 is held open and the movable contact 14a of the ejection selection switch 14 is held in contact with the stationary contact 14c.

When a cartridge is set in a predetermined position in this state, the tape accommodated in said cartridge is driven from the motor 2 for reproduction or recording. In this case, the motor 2 rotates at a predetermined speed optimum for reproduction or recording.

Now, when the sensing switch 6 is shorted by the conductive foil on the tape in the process of reproduction or recording operation, a current passes in the program changing plunger 7 through the conductive foil to actuate said plunger 7, so that head is shifted by said plunger to perform reproduction or recording of the next program.

For instance, when the sensing switch 6 is shorted by the conductive foil at the end of the fourth program, the current flows in the circuit including the movable contact 10a and stationary contact 10b of the switch 10, the diode 11, the movable contact O and stationary contact IV of the rotary switch 12 and the capacitor 13, whereby said capacitor 13 is charged. Concurrently with charging of the capacitor 13, the current also passes in the program changing plunger 7, so that the program to be reproduced or recorded is changed to the first program, and at the same time, the movable contact O of the rotary switch 12 is switched from the stationary contact IV to I. The point when the head is shifted by the operation of the program changing plunger 7 and the point when the movable contact O of the rotary switch 12 is switched from the stationary contact IV to I, is the point when the sensing switch 6 is relieved from the state of being shorted by the conductive foil and the plunger 7 makes its return movement. The diode 11 is provided for the purpose of preventing the current stored in the capacitor 13 from being discharged therefrom through the program changing plunger 7 during the period before the sensing switch 6 is opened and the movable contact O of the rotary switch 12 is switched from the stationary contact IV to I by the return movement of the plunger 7.

In the event when the movable contact 14*a* of the ejection selection switch 14 is previously held in contact with the stationary contact 14*b* at the time when the capacitor 13 has been charged and the movable contact O of the rotary switch has been switched from the stationary contact IV to I, the current stored in the capacitor 13 is discharged through the ejection plunger 9, so that said ejection plunger 9 is actuated to eject the cartridge.

In the event when the movable contact 14*a* of the ejection selection switch 14 is in contact with the stationary contact 14*c*, the discharge circuit of the capacitor 13 is opened, so that the ejection plunger 9 is not actuated and hence, in this case, reproduction or recording of the first program is carried out in succession to the fourth program.

In the recording operation, if recording is carried out continuously, for example, from the first to fourth program and from the fourth program again to the first program, the sound previously recorded in the first program will be replaced by new sound. In such a case, therefore, it becomes necessary to previously set the apparatus such that the cartridge may be ejected without fail upon completion of recording in the fourth program, and this is achieved by previously switchingthe movable contact switching the a of the ejection selection switch 14 into contact with the stationary contact 14*b*.

Next, a program retrieval operation by means of the tape fast forward mechanism will be described. When the movable contact 4*a* of the fast forward switch 4 is switched into contact with the stationary contact 4*c*, the speed of the motor 2 increases and accordingly the tape is driven at a speed higher than the reproducing or recording speed.

On the other hand, the movable contact 10*a* of the switch 10 is switched into contact with the stationary contact 10*c*, incident to the switching operation of the fast forward switch 4.

When the sensing switch 6 is shorted by the conductive foil, with the apparatus being set in the fast forward position as described above, the program changing plunger 7 is actuated to change the reproduction or recording program, and concurrently the current passes from the sensing switch 6 through the movable contact 10*a* and stationary contact 10*c* of the switch 10 to the ejection plunger 9 to actuate said ejection plunger 9, so that the cartridge is ejected, with the programs being rearranged in situs. Therefore, where it is desired to start recording from the first program, since the first program is already retrieved at the recording starting position when the cartridge is ejected after the fourth program has been ended by the fast forward operation, recording may be started from the position of the tape as being set in the cartridge. Thus, the retrieval of the program can be achieved with accuracy and quickly since it is effected by the tape fast forward operation.

During the tape fast forward operation mentioned above, the movable contact 10*a* of the switch 10 is held out of contact with the stationary contact 10*b*, so that the capacitor 13 is not charged and the cartridge is ejected without fail at the end of each program, independently of the position of the ejection selection switch 14, and thus the next program is retrieved in its starting position. Where it is desired to eject the cartridge in the process of reproduction, recording or fast forward operation, this can be achieved simply by manually closing the manual ejection switch 8.

Although the embodiment of the invention has been described above as being arranged such that the cartridge is ejected at the end of the fourth program by the operation of the ejection selection switch 14, whereby the first program is retrieved in its starting position, it will be understood that by changing the position of connection of the rotary switch 12, any other program may be retrieved in its starting position as desired.

It will also be understood that, although in the embodiment described above, a capacitor was used as a drive source for actuating the ejection plunger 9 subsequent to actuation of the ejection selection switch 14 to achieve the retrieval of a desired program, any other drive source and circuit arrangement may also be used to achieve the same purpose.

As described above, the apparatus of the invention is so constructed that, when a switch operatively associated with a fast forward switch is operated and a sensing switch is electrically shorted by an electrically conductive foil provided on a running tape, after said fast forward switch has been actuated to increase the speed of a tape driving motor and thereby the apparatus has been placed in a fast forward operation with the tape running at a speed faster than the normal reproduction or recording speed, a cartridge ejection plunger is always actuated to eject the cartridge in which said tape is accommodated. According to the invention, once the apparatus has been shifted to the fast forward operation, the cartridge is ejected without fail at the point when the sensing switch is electrically shorted by the electrically conductive foil upon termination of each program, so that the retrieval of program can be effected positively, which is highly convenient especially in commencing recording. Furthermore, the ejection of cartridge can be effected during the fast forward operation of the apparatus, so that the retrieval of program can be achieved in a very short period of time, whch enhances the operational efficiency of the apparatus.

In the apparatus of the invention, the arrangement is also made such that the cartridge can be ejected only when a specific program has been ended during the reproduction or recording operation. Therefore, it is possible to eject the cartridge upon completion of reproduction or recording of all programs. This is advantageous particularly in the recording operation, in that over dubled recording can be completely avoided and recording can be achieved in a reliable and steady manner. Thus, the present invention is of great industrial advantage.

What is claim is:

1. A cartridge type magnetic tape recording and reproducing apparatus comprising a fast forward switch for increasing the speed of a tape driving motor to drive a tape at a speed higher than the normal reproducing or recording speed, a switch operatively associated with said fast forward switch to be operated thereby and a sensing switch adapted to be electrically shorted by an electrically conductive foil provided on the tape, said second switch and said sensing switch being inserted in an operating circuit for a cartridge ejection plunger, whereby when said fast forward switch is actuated for a tape fast forward operation, said second switch is operated by said fast forward switch, closing said operating circuit for the cartridge ejection plunger and, when said sensing switch is electrically shorted by the electrically conductive foil on the tape, said ejection plunger is operated to eject the cartridge in which the tape is accommodated.

2. A cartridge type magnetic tape recording and reproducing apparatus comprising a fast forward switch for increasing the speed of a tape driving motor to drive a tape at a speed higher than the normal reproducing or recording speed, a switch operatively associated with said fast forward switch to be operated thereby, a sensing switch adapted to be electrically shorted by an electrically conductive foil provided on the tape, a reproduction or recording program changing plunger which will be operated when said sensing switch is electrically shorted, a rotary switch controllably operated by said program changing plunger into a position corresponding to the program designated by said plunger, and a cartridge ejection plunger, said second switch being inserted between said sensing switch and said cartridge ejection plunger, whereby when said fast forward switch is actuated for a tape fast forward operation, said second switch is operated by said fast forward switch connecting said sensing switch with said cartridge ejection plunger and, when said sensing switch is electrically shorted by the electrically conductive foil on the tape, said cartridge ejection plunger is operated to eject the cartridge in which the tape is accommodated, and further when the apparatus is in the reproduction or recording operation, said cartridge ejection plunger is operated to eject the cartridge only when a specific program previously set in said rotary switch has been ended and said sensing switch has been electrically shorted by the electrically conductive foil.

* * * * *

UNITED STATES PATENT OFFICE

CERTIFICATE OF CORRECTION

Patent No. 3,758,789 Dated September 11, 1973

Inventor(s) Toshio KAWADA, et al

It is certified that error appears in the above-identified patent and that said Letters Patent are hereby corrected as shown below:

Please include the priority information as follows:

Foreign Application Priority Data

Oct. 7, 1971 Japan........................ 79201/71
Oct. 7, 1971 Japan........................ 79202/71

Please correct the misspelling of one of the inventor's names:
Tamio Kobayahsi should read --Tamio Kobayashi--.

Signed and sealed this 2nd day of April 1974.

(SEAL)
Attest:

EDWARD M.FLETCHER,JR.
Attesting Officer

C. MARSHALL DANN
Commissioner of Patents